United States Patent [19]
Marcus

[11] 4,247,850
[45] Jan. 27, 1981

[54] VISOR AND GARAGE DOOR OPERATOR ASSEMBLY

[75] Inventor: Konrad H. Marcus, Holland, Mich.

[73] Assignee: Prince Corporation, Holland, Mich.

[21] Appl. No.: 822,055

[22] Filed: Aug. 5, 1977

[51] Int. Cl.³ .................... H04B 7/00; H04B 1/03; B60R 7/00

[52] U.S. Cl. .................................... 340/694; 340/696; 455/95; 455/99; 224/312; 296/97 H; 49/25; 350/276 R; 179/146 R; 179/153

[58] Field of Search .............................. 343/225, 228; 350/276 R, 277, 288, 307; 296/97 A, 97 B, 97 H, 97 J; 362/61; 224/29 A; 49/25; 179/100 R, 146 R, 153; 325/111, 118, 117, 102, 310, 312; 340/694, 696; 455/95, 99

[56] References Cited
U.S. PATENT DOCUMENTS

| | | | |
|---|---|---|---|
| 2,558,434 | 6/1951 | Hofberg | 325/117 |
| 3,099,797 | 7/1963 | Piccinini | 343/713 |
| 3,906,348 | 9/1975 | Willmott | 343/225 |
| 3,926,470 | 12/1975 | Marcus | 350/276 R |
| 3,936,833 | 2/1976 | Bush | 343/225 |
| 4,056,696 | 11/1977 | Meyerle et al. | 179/146 R |

*Primary Examiner*—John W. Caldwell, Sr.
*Assistant Examiner*—Donnie L. Crosland
*Attorney, Agent, or Firm*—Price, Heneveld, Huizenga & Cooper

[57] ABSTRACT

A visor and garage door operator assembly including a sun visor incorporating the transmitter of a radio controlled garage door operating system in which the transmitter is disposed within the recess of a visor and is provided with coding switches which are easily accessible for adjustment to change from one code to another. A compartment assembly, preferably a mirror unit, is mounted over the recess and includes a frame on which is mounted the control switch for the transmitter.

12 Claims, 6 Drawing Figures

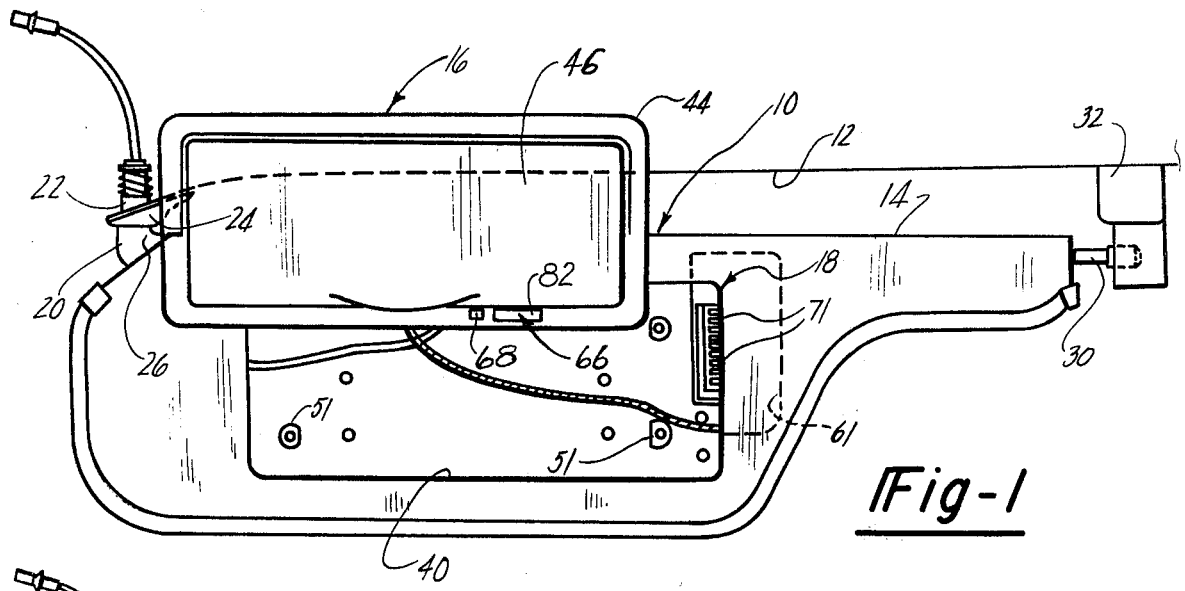
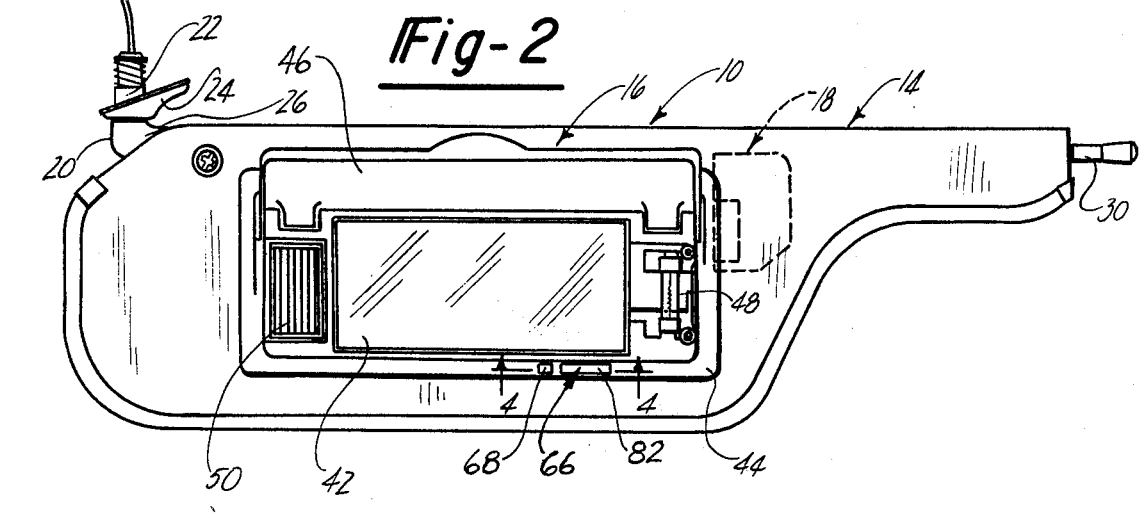
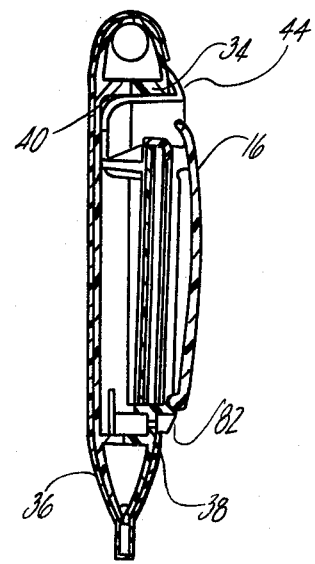

VISOR AND GARAGE DOOR OPERATOR ASSEMBLY

This invention relates to sun visor assemblies for vehicles incorporating the transmitter of a radio controlled garage door operating system.

Sun visors have been one of the locations used for hand held transmitters used as garage door opener controls. Usually clips or brackets are provided making it possible to attach the transmitter to the visor or to other selected locations in the vehicle. Such hand held garage door opening transmitters typically incorporate a separate battery power source and as a result are relatively heavy. When attached to a visor they exert a load on the friction connections that are relied on to hold the visor in its storage position. On the other hand, disposing the transmitter on the instrument panel cowl exposes the transmitter and its power source to sun's rays and heat which is damaging to the power source. Also, it makes the transmitter visible and subject to possible theft. On the other hand, if the transmitter is located below the level of the instrument cowl, the operation of the transmitter is seriously impeded.

It is desirable to have, and it is an object of the invention to provide, a light weight visor mounted garage door control which is permanently associated with the visor.

Another object of the invention is to provide such a visor assembly in which the garage door operator is concealed within the visor and which uses the power source of the vehicle.

Still another object of the invention is to provide a garage door transmitter in a visor assembly that also incorporates a covered vanity mirror in which the control switch for operation of the garage door operator is accessible even when the vanity mirror is covered.

Still a further object of the invention is to provide a visor and vanity mirror assembly incorporating a garage door transmitter wherein the transmitter may be selectively coded to match an identically coded receiver so that the signal for operating the garage door may be selected by the user.

A visor assembly for vehicles is provided wherein the visor has a generally hollow construction forming a cavity, a portion of which forms a receptacle for holding a transmitter of a garage door opening system in which the transmitter receives its power from the vehicle power source by way of a circuit which includes a switch for energizing the transmitter. The transmitter is concealed within the visor and incorporates a plurality of code switches which may be set to conform to the setting of similar codes switches in a receiver. The code switches of the transmitter are exposed upon removal of a compartment or an illuminated vanity mirror assembly fitted into the visor.

These and other objects of the invention will become apparent from the following description and from the drawings in which:

FIG. 1 is a view of the visor assembly embodying the invention with a mirror subassembly partially removed from the visor;

FIG. 2 is a view similar to FIG. 1 showing the visor assembly with the vanity mirror cover in an open position and with one of the light lenses removed;

FIG. 3 is a cross-sectional view taken in generally on line 3—3 and FIG. 2.

Figure 4:
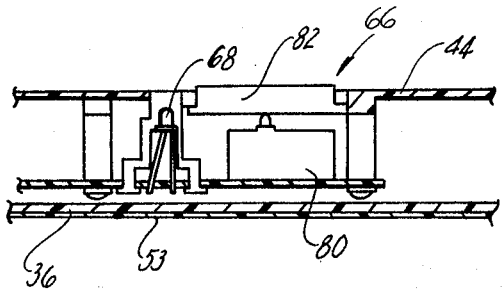
FIG. 4 is a cross-sectional view at an enlarged scale taken on line 4—4 in FIG. 2.

Referring to the drawings a visor assembly embodying the invention is designated generally by the numeral 10 and is of a type intended to be installed on the driver's side of a vehicle above the windshield and attached to the windshield header indicated at 12. The visor assembly 10 includes a visor 14, a covered vanity mirror assembly 16 and a transmitter 18 for operating a radio controlled garage door opening system.

The visor 14 is swingably supported from a L-shaped elbow connector 20 having one leg 22 rotatably supported in a bracket 24 mounted on the vehicle windshield header 12 to permit swinging movement of the visor 14 about a generally vertical axia. Another leg 26 of the elbow connector 20 supports the visor to permit swinging movement of the visor assembly 10 about a generally horizontal axis. The end of the visor 14 remote from the elbow connector 20 is provided with a pin 30 in axial alignment with the rod 28 and adapted to be received in a center support bracket 32. In the storage position of the visor 14, the pin 30 is in the center bracket 32 and the visor 14 is pivoted upwardly to lie in a storage position generally horizontally to the roof of the vehicle and above the windshield header 12. The visor 14 may swing downwardly about the horizontal axis formed by the leg 26 and pin 30 to an operating position to shield the driver's eyes from reflections. Also the pin 30 may be detached from the center bracket 32 to swing the visor 14 about the vertical axis formed by the leg 22 to shield the driver from light from a side of the vehicle.

The visor 14 includes a core 34 formed of a suitably material such as polypropylene or other plastic. The core 34 is molded of a single piece and in the assembled condition seen in FIG. 3, the core has a rear wall 36 and a forward wall 38 which when joined together make up a generally hollow structure. The forward wall 38 has an opening 40 to receive the covered vanity mirror assembly 16.

The visor 14 and the vanity mirror assembly 16 are more specifically described in U.S. Pat. No. 3,926,470 granted to me on Dec. 16, 1975. In general the mirror assembly forms a covered compartment in which a reflective mirror surface 42 is fitted in a frame member 44 and has a cover 46 hinged to the frame member 44, the cover may be moved from its closed position shown in FIG. 1 covering the mirror 42 to an open position in which the mirror is exposed for view.

The mirror 42 is illuminated by a lighting arrangement including a pair of lamps 48 each covered by a lens 50 and disposed at opposite ends of the mirror 42. The vanity mirror assembly 16 is removably attached to the visor 14 by means of screws (not shown) fitted into attaching posts 51 formed integrally with the core 34 of the visor 14. The screws are concealed by the lenses 50.

Figure 5:
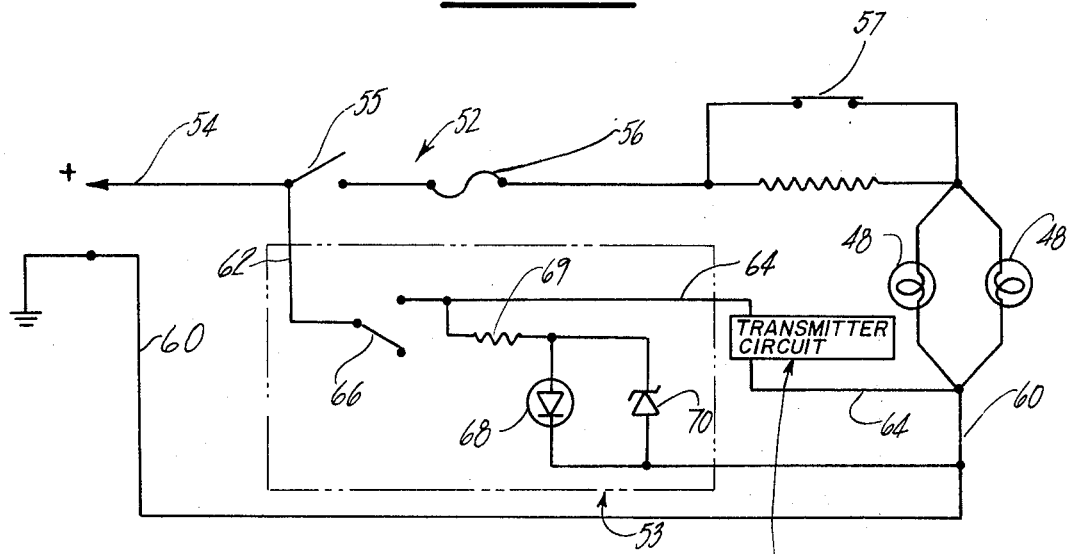
FIG. 5 is a diagrammatic view of the circuit employed for energizing the vanity mirror lamp and garage door opening transmitter.

The lighted vanity mirror circuit 52 connecting the lamps 48 is supported on the rear surface of the mirror 42 and is shown diagrammatically in FIG. 5. The circuit 52 includes a positive conductor 54 connected through an on-off switch 55 and through a fuse 56 to a parallel connected dimmer switch 57 and resistive wire 58 and to the terminal of the lamps 48. The circuit 52 to the lamps 48 is completed by a negative terminal or ground wire 60. The dimmer switch 57 is such that in its open position, current passes through the resistive wire 58 to dim the lights. The switch 55 is so arranged that it closes upon opening of the mirror cover 46 to complete the circuit to the lamps 48 and cause their illumination. The positive and negative conductors 54 and 60 are connected through the elbow 20 to the usual electrical power source of the vehicle.

The garage door opening system includes the transmitter circuit herein identified as transmitter 18, which may be of any known type circuit capable of providing a serially transmitted digital code, such as the transmitter circuit disclosed in U.S. Pat. No. 3,906,348. The transmitter 18 is connected in the circuit 52 as seen in FIG. 5. The circuit for connecting transmitter 18 into the visor lighting circuit includes a transmitter power circuit 53 which receives power through conductors 54 and 60 of the visor lighting circuit 52. The circuit 53 includes a branch line 62 and a branch line 64 which respectively connect the conductors 54 and 60 to the transmitter 18. Also included in the transmitter power circuit 53 is a manually operated switch assembly 66 which is movable from its opened to a closed position to energize the transmitter 18. Actuation or closing or the switch assembly 66 to energize the transmitter 18 also serves to energize and illuminate a light emitting diode 68 connected in series with a voltage dropping resistor 69, the branch line 62 and the conductor 60. A zener diode 70 is connected in parallel with the light emitting diode 68 to protect the latter from current surges.

Figure 6:
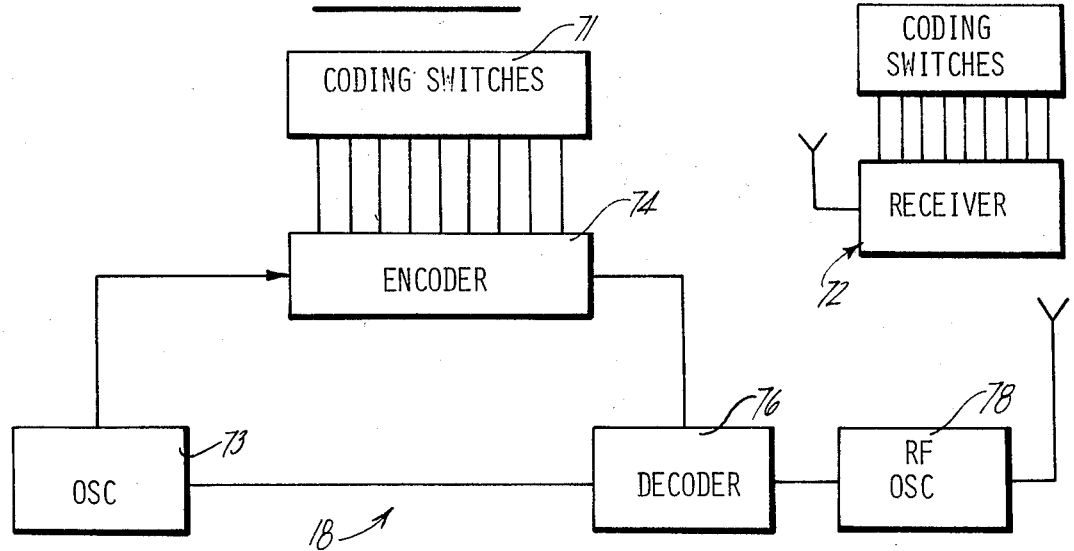
FIG. 6 is a diagrammatic view of the circuit of the transmitter in FIG. 5.

The transmitter 18 function is such that a serially transmitted digital code can be established by setting a number of two position code switches indicated at 71 in FIGS. 1 and 6 to transmit on a radio frequency carrier a plurality of binary pulses representative on the pulse length. A receiver 72 within radio frequency range is provided with an equal number of two position switches that may be set to a particular code identical with that of the transmitter so that the receiver 72 will accept the code and energize mechanism for opening the garage door.

As seen in FIG. 6, the present system incorporates an oscillator 73 which supplies the driving frequency for an encoder 74 and decoder 76. The encoder 74 develops the digital code in accordance with the position switches 71 and may be in the form of swift register. This digital coded information is supplied to the decoder 76 which develops a decoded drive signal, e.g., in analog form, for operating an RF oscillator 78 which then provides an RF signal of the desired frequency and wave shape so that it can be received by the receiver 72 which is identically coded.

As best seen in FIG. 2, the transmitter 18 is disposed in a pocket or receptacle 61 formed in the hollow core 34 adjacent to one side of the opening 40 in the visor 14 as see in FIG. 1. The transmitter 18 is used to signal the receiver 72 in a garage to initiate operation of garage door opening and closing equipment which is not shown. The receiver 72 may be of any known type capable of combining with the transmitter 18; e.g. the type disclosed in the aforementioned U.S. Pat. No. 3,906,348.

The code is determined and can be established in the transmitter 18 by setting a selected number of the two position code switches 71 to transmit on a radio frequency carrier selected pulses. The present system incorporates nine coding switches 71 and similarly the receiver 80 incorporates a like number of switches. The nine switches are located in a group adjacent to each other and the group of switches is located for easy access in the recess close to one edge of the opening 40 after the vanity mirror assembly 16 has been removed from the visor as seen in FIG. 1. The number of available codes depends on the number of switches employed. In the present instance with two distance pulse widths available at each of the coding switches, and with the number of switches being nine, the number of possible different codes for a single RF channel is 512. The means for changing codes by the user requires no test equipment and codes may be set at the transmitter by removing the vanity mirror assembly 16 and setting selected ones of the coding switches 71 to the desired position. Similarly the coding switches associated with the receiver 72 must be set to the same sequence. As mentioned, the transmitter and receiver coding system may be of the type disclosed in detail and U.S. Pat. No. 3,906,348 to Colin B. Willmott. Such systems, particularly of the type including hand held transmitters, are available through Chamberlain Manufacturing Corporation of Chicago, Illinois, the assignee of the above named patent.

The switch 66 by which the transmitter 18 is actuated is disposed separately from the transmitter 18 at a lower side of the frame 44 of the vanity mirror (FIGS. 1 and 2). As best seen in FIG. 4, the switch assembly 66 includes a miniature push button switch 80 actuated by an actuator element 82 shaped as seen in FIG. 3 to conform with the contour of the mirror frame 44. Pushing of the element 82 serves to actuate the switch 80 and transmitter 18 as well as to illuminate the light emitting diode 68 to give a visual signal that the control has been actuated.

When it is desired to transmit a signal to the receiver 72 associated with the garage door equipment in the garage which is to house the vehicle, pressing of the element 82 serves to energize the transmitter 18. A coded signal is transmitted to the receiver 72 and since the receiver will be preset with the same code, the garage door mechanism will be energized. Since the transmitter 18 is disposed within the visor 14 and the visor is closely adjacent to the glass area of the windshield, a strong signal will be transmitted and will not be obscured by other electronic components or metallic members of the vehicle.

A visor assembly for a vehicle is provided which includes a generally hollow sun visor incorporating a transmitter of a radio controlled garage door operating system. The transmitter including switches which may be set to conform to the code similarly set in a garage door receiver. The coding switches are disposed for easy access within the visor upon removal of an illuminated vanity mirror arrangement which is detachably connected to the visor.

The embodiments of the invention in which an exclusive property or privilege is claimed are defined as follows:

1. A visor assembly for a vehicle or the like comprising:
   a visor having a recess formed therein;
   a mirror unit having a frame mounted over said recess and a mirror mounted within said frame;
   transmitter means mounted in said recess for transmitting a signal to a receiver for operating a garage door opening system;
   means adapted for connection to the power source of the vehicle, said means being connected to the transmitter means through an actuator switch which is adapted for coupling the transmitter means to the power source of the vehicle so as to energize said transmitter means;

said switch including an actuator element mounted on said frame.

2. The combination of claim 1 wherein said transmitter and switch means are located in a circuit means and a light means is disposed in said circuit means for illumination upon actuation of said switch.

3. The combination of claim 1 in which said visor is movable from a storage position to an operating position in which said visor is disposed generally vertically, said mirror unit and thereby said switch means being disposed at a face of said visor facing the vehicle operator when the visor is in said operating position.

4. The combination of claim 1 wherein said transmitter includes a plurality of code switches exposed upon removal of said mirror unit for adjustment to selected positions.

5. The visor assembly of claim 1 in which said transmitter means is mounted at a position located outside the boundary of said mirror.

6. The combination of claim 1 in which said transmitted means and switch are located in a circuit means and a light means is mounted on said frame and is disposed in said circuit means for illumination upon actuation of said switch.

7. A visor assembly for a vehicle or the like comprising a visor having a recess and adapted for movement from a storage position to an operating position in which said visor is disposed in an approximately vertical plane, a compartment assembly including a frame member mounted on said visor, a cover closing said compartment assembly, a transmitter disposed in the recess of said visor for transmitting a signal to a receiver of a garage door opening system, a vehicle power source means, circuit means coupling said transmitter means to said power source means, and switch means mounted on said frame and connected to said circuit means to energize said transmitter.

8. The combination of claim 7 and further comprising light means in said circuit means, said light means being energized upon closing of said switch means to energize said transmitter.

9. The visor assembly of claim 8 in which the light means is mounted on said frame.

10. The combination of claim 7 in which said light means is disposed on said frame and is visible upon illumination with said cover in said closed position.

11. The combination of claim 7 in which said compartment assembly is detachable from said visor, said transmitter being accessible in said recess when said compartment is removed therefrom.

12. The combination of claim 7 wherein said transmitter includes a plurality of code switches, said code switches being accessible for actuation upon removal of said compartment assembly from said visor.

* * * * *